(12) United States Patent
Simone et al.

(10) Patent No.: US 6,650,271 B1
(45) Date of Patent: Nov. 18, 2003

(54) SIGNAL RECEIVER HAVING ADAPTIVE INTERFERING SIGNAL CANCELLATION

(75) Inventors: Joseph D. Simone, Chelmsford, MA (US); Edward A. Seghezzi, Londonderry, NH (US)

(73) Assignee: Raytheon Company, Lexington, MA (US)

(*) Notice: Subject to any disclaimer, the term of this patent is extended or adjusted under 35 U.S.C. 154(b) by 1268 days.

(21) Appl. No.: 08/979,442

(22) Filed: Nov. 24, 1997

(51) Int. Cl.[7] .................................................. G01S 7/36
(52) U.S. Cl. ........................... 342/16; 342/17; 342/98; 342/102; 342/159; 342/162; 342/192
(58) Field of Search ............................. 342/16, 17, 18, 342/19, 39, 98, 99, 100, 101, 102, 159, 162, 148, 192, 194, 195, 196

(56) References Cited

U.S. PATENT DOCUMENTS

| | | | | |
|---|---|---|---|---|
| 3,882,498 A | * | 5/1975 | McGuffin | 342/91 |
| 3,995,271 A | * | 11/1976 | Goggins, Jr. | 342/91 |
| 4,268,829 A | * | 5/1981 | Baurle et al. | 342/380 |
| 4,280,128 A | * | 7/1981 | Masak | 342/380 |
| 5,703,593 A | * | 12/1997 | Campbell et al. | 342/96 |
| 5,892,477 A | * | 4/1999 | Wehling | 342/18 |
| 5,933,446 A | * | 8/1999 | Bond et al. | 375/130 |
| 6,031,882 A | * | 2/2000 | Enge et al. | 375/343 |
| 6,100,838 A | * | 8/2000 | Richmond et al. | 342/17 |
| 6,121,914 A | * | 9/2000 | Cavelos et al. | 342/16 |
| 6,268,821 B1 | * | 7/2001 | Shrader et al. | 342/17 |
| 6,295,017 B1 | * | 9/2001 | Ivanov et al. | 342/17 |
| 6,297,772 B1 | * | 10/2001 | Lewis | 342/381 |
| 6,313,782 B1 | * | 11/2001 | Lehan et al. | 342/16 |
| 6,317,072 B1 | * | 11/2001 | Dollinger | 342/16 |
| 6,486,824 B1 | * | 11/2002 | Shupe | 342/16 |

* cited by examiner

*Primary Examiner*—John B. Sotomayor
(74) *Attorney, Agent, or Firm*—Daly, Crowley & Mofford, LLP

(57) ABSTRACT

A radar system receiver having an antenna system adapted to receive a jammer signal from both a direct path and from an indirect path. The direct and indirect paths have both differential Doppler frequency and differential time delay induced phase shifts. The antenna system includes a plurality of antenna elements. A plurality of radar receiver sections, each one having a clutter filter, is provided. Each one of the receiver sections is fed by a corresponding one of the antenna elements. An adaptive jammer canceler is fed by the plurality of radar receiver sections for providing a beam forming network to suppress both the direct and indirect paths of the jamming signal. The adaptive canceler separates each of a plurality of radar dwells into a plurality of sub-intervals, determines frequency components in each of the sub-intervals over a predetermined frequency bandwidth, forms a plurality of frequency sub-band beam forming networks from the frequency components for each of a corresponding one of the sub-intervals to suppress the differential time delay phase shifts in the received jamming signal, and produces a composite output signal from the plurality of frequency sub-band beam forming networks and the plurality of subintervals to suppress the differential Doppler frequency induced phase shifts in the received jamming signal.

4 Claims, 2 Drawing Sheets

SIGNAL RECEIVER HAVING ADAPTIVE INTERFERING SIGNAL CANCELLATION

BACKGROUND OF THE INVENTION

This invention relates generally to signal receivers and more particularly to receivers having adaptive interfering signal cancellation.

As is known in the art, considerable effort has been made in recent years to provide adaptive interfering signal cancellation. One such interfering signal is a radar system jammer signal. In such application, there are two components from the jammer which must be canceled: a direct path component; and an indirect path component. The indirect path component results from jammer signals which bounce from adjacent clutter (i.e., terrain bounces) which extend over a wide azimuth angle and are received by a mainbeam of the radar system receiver antenna even though the jammer is positioned in a sidelobe of the antenna. These multi-path terrain bounce signals may adversely effect the effective azimuth target detection coverage of the radar system.

One technique used to suppress interfering signals is described in U.S. Pat. No. 4,720,712 entitled "Adaptive Beam Forming Apparatus" issued Jan. 19, 1988, inventors Brookner et al, assigned to the same assignee as the present invention, the entire subject matter contained therein being incorporated herein by reference. Such U.S. Patent refers to the use of Sample Matrix Inversion techniques to provide main lobe nulling of the antenna beam to suppress an interfering signal. The Sample Matrix Inversion (SMI) technique is described in an article entitled "Rapid Convergence Rate in Adaptive Arrays", by I. S. Reed, J. D. Mallet, and L. E. Brennan, published in the "IEEE Transactions on Aerospace and Electronic Systems", volume AES-10, No. 6, November, 1984. pages 853–863. Still other beamforming and adaptive cancellation techniques are described in an article entitled "Beamforming: A Versatile Approach to Spatial Filtering" by Barry D. VanVeen and Kevin M. Buckley, published in IEEE ASSP Magazine, April 1989, pages 4–24.

One technique used to suppress direct and indirect paths of an interfering signal includes the use of an adaptive processor having time delay and Doppler frequency taps. Adaptive processors using these taps achieve almost ideal performance at the expense of processing throughput. An important feature in the adaptive processor is the correlation between the jammer signal in the direct path and the jammer signal in the indirect path. When the direct path and the indirect path signals received by the antenna system are correlated, cancellation of sidelobe direct path and mainbeam (i.e., mainlobe) indirect path occurs without requiring mainlobe nulling as described in the above-reference U.S. Patent. In general, however, the direct path and the indirect path signals are somewhat de-correlated. The source of this de-correlation is due to differential Doppler frequency and time delay induced phase shifts. Differential Doppler frequency results when there is a relative velocity between the radar system receiver antenna and the jammer. The amount of de-correlation is dependent on the geometric relationship between the jammer, terrain (i.e., clutter) illuminated by the jammer and the radar system receiver antenna.

SUMMARY OF THE INVENTION

In accordance with one feature of the invention a receiver is provided having an array of elements adapted to receive an interfering signal from both a direct path and from an indirect path. The direct and indirect paths have both differential Doppler frequency and differential time delay induced phase shifts. A plurality of receiver sections is provided. Each one of the receiver sections is fed by a corresponding one of the elements. An adaptive interfering signal canceler is fed by the plurality of receiver sections for providing an adaptive beam forming network to suppress both the direct and indirect paths of the interfering signal. The adaptive canceler separates the signal received by the elements into a plurality of sub-intervals, determines frequency components over a pre-determined bandwidth in each of the sub-intervals, forms a plurality of frequency sub-bands from the determined frequency components, provides adaptive beam forming networks for each of a corresponding one of the frequency sub-bands in each one of the sub-intervals to suppress the differential time delay phase shifts in the received interfering signal, and combines outputs from the plurality of frequency sub-band beam forming networks over the plurality of sub-intervals to produce a composite output signal having suppressed the differential Doppler frequency induced phase shifts in the received interfering signal.

In accordance with another feature of the invention, a radar system receiver is provided having an antenna system adapted to receive a jammer signal from both a direct path and from an indirect path, such direct and indirect paths having both differential Doppler frequency and differential time delay induced phase shifts. The antenna system includes a plurality of antenna elements. A plurality of radar receiver sections, each one having a clutter filter, is provided. Each one of the receiver sections is fed by a corresponding one of the antenna elements. An adaptive jammer canceler is fed by the plurality of radar receiver sections for providing a beam to suppress both the direct and indirect paths of the jamming signal. The adaptive canceler includes a frequency transformation section for determining frequency components in each of a plurality of frequency bands in signals received from the jammer by each one of the plurality of antenna elements over a predetermined frequency bandwidth. The adaptive canceler also includes a covariance matrix fed by the frequency sub-bands of the determined frequency components for each of the plurality of antenna elements for determining covariance matrix coefficients for each of the frequency sub-bands. A beam forming network is fed by the frequency sub-bands and the covariance matrix coefficients for forming an antenna beam for each of one of series of sub-intervals of a radar dwell to suppress the differential time delay phase shifts in the received jamming signal. Inverse frequency transformation and combiner sections are provided for forming a composite output signal from the antenna beams produced over the series sub-intervals to suppress the differential Doppler frequency induced phase shifts in the received jamming signal. The composite output signal represents the beam provided by the adaptive canceler to suppress both the direct and indirect paths of the jamming signal.

In accordance with still another feature of the invention, a method is provided for canceling both differential Doppler frequency and differential time delay induced phase shifts produced by direct and indirect paths of an interfering signal received by an array of elements adapted to receive the interfering signal. The method includes the step of determining, for each a plurality of radar dwell sub-intervals, frequency components of signals received by each of the elements in each of a plurality of frequency sub-bands over a predetermined frequency bandwidth. For each of the plurality of sub-intervals, a beam is produced for each one of a determined frequency sub-bands in each sub-interval.

The beam is adaptively formed to suppress the differential time delay induced phase shifts in the received interfering signal during the sub-interval. The beams produced for each one of the sub-intervals in a dwell are combined into a composite beam for the dwell, the composite beam being adapted to suppress the differential Doppler frequency induced phase shifts in the received interfering signal.

In accordance with still another feature of the invention, a method is provided for canceling both differential Doppler frequency and differential time delay induced phase shifts produced by direct and indirect paths of an interfering signal received by an antenna system. The antenna system includes a plurality of antenna elements adapted to receive the interfering signal. The method includes the step of determining for each a plurality of sub-intervals: (a) frequency components of signals received by each of the antenna elements in each of a plurality of frequency sub-bands over a predetermined frequency bandwidth; and, (b) covariance matrix coefficients for each one of a plurality of frequency sub-bands of the predetermined bandwidth in response to the signals in such one of the frequency sub-bands received by the plurality of antenna elements. A beam is produced for each of the plurality of sub-intervals for each one of the frequency sub-band from the covariance matrix coefficients determined in each sub-interval. The beams are adapted to suppress the differential time delay induced phase shifts in the received interfering signal during the sub-interval. The beams produced for each one of the sub-intervals in a dwell are combined into a composite beam, the composite beam being adapted to suppress the differential Doppler frequency induced phase shifts in the received interfering signal.

With such systems and methods, an adaptive canceler is provided which utilizes a balance between both narrow nulling bands and short sub-intervals. More particularly, over a relatively large radar dwell, differential Doppler frequency induced phase shift of the received jammer signal will change over the dwell (i.e., for a constant Doppler frequency, the phase will change linearly over the dwell). Further, over a large frequency band, differential time delay induced phase shift of the received jammer signal will change over the dwell. In accordance with the invention, instead of generating covariance matrix coefficients over the entire dwell (which results in such coefficients nulling an average differential Doppler frequency shift over the entire dwell), each radar dwell is divided into a plurality of sub-intervals to generate, for each relatively short sub-interval, covariance matrix coefficients thereby reducing the differential Doppler frequency induced phase shifts. Also, by dividing the entire frequency bandwidth being processed into frequency sub-bands and processing each frequency sub-band to produce the covariance matrix coefficients for each frequency sub-band (i.e., for each sub-interval a plurality of frequency sub-band beam forming networks are configured, one beam forming network for a corresponding one of the frequency sub-bands), differential time delay induced phase shifts are reduced.

Further, with the invention, significant reduction is made in computation by making a balance between differential Doppler frequency performance and differential time delay performance in suppressing direct and indirect signal paths of a jammer or interfering signal. More particularly, signal processing parameters important to the correlation of the jammer's direct and indirect path signals are the nulling bandwidth (i.e., nulling sample time) and the nulling time interval (i.e., nulling frequency resolution). The direct and indirect signals are completely de-correlated when the differential time delay is equal to the reciprocal of the nulling bandwidth or when the differential Doppler frequency is the reciprocal of the nulling time interval. More particularly, controlling the adaptive nulling bandwidth and time interval are used as an adaptive cancellation technique. The nulling time interval may be made short, (i.e., divided into sub-intervals) to drive the system immune to differential Doppler frequency induced phase shifts. Alternatively, the nulling bandwidth may be reduced (i.e., use sub-banding) to drive the system immune to differential time delay induced phase shifts. Ideally, both short time intervals and narrow nulling bands could be used to drive the system to be immune to both differential Doppler and time delay. However, the two approaches are in direct conflict. As the nulling interval is shortened (in either frequency or time) the number of data samples of the received signal available for covariance matrix coefficient generation is reduced. As the ratio of the number of samples to the number of degrees of freedom in the adaptation decreases, the covariance matrix coefficient loss increases which results in decreased system performance. To provide sufficient data samples when using short sub-intervals, the system is driven to larger nulling bandwidths which results in degraded differential time delay performance. On the other hand, using narrow nulling bands necessitates the use of increased sub-interval time to provide sufficient samples which thereby results in degraded differential Doppler performance. Thus, a processor that utilizes narrow nulling bands and short sub-intervals to mitigate the impact of the indirect path jamming is a balance between differential Doppler frequency performance, differential time delay performance and covariance matrix loss. There are applications with few elements or low level indirect jamming where this balance is achievable and provides a low cost, effective solution to jammer multipath.

BRIEF DESCRIPTION OF THE DRAWING

These and other features of the invention will become more readily apparent form the following detailed description when read together with the following drawings in which.

DESCRIPTION OF THE PREFERRED EMBODIMENTS

Figure 1:
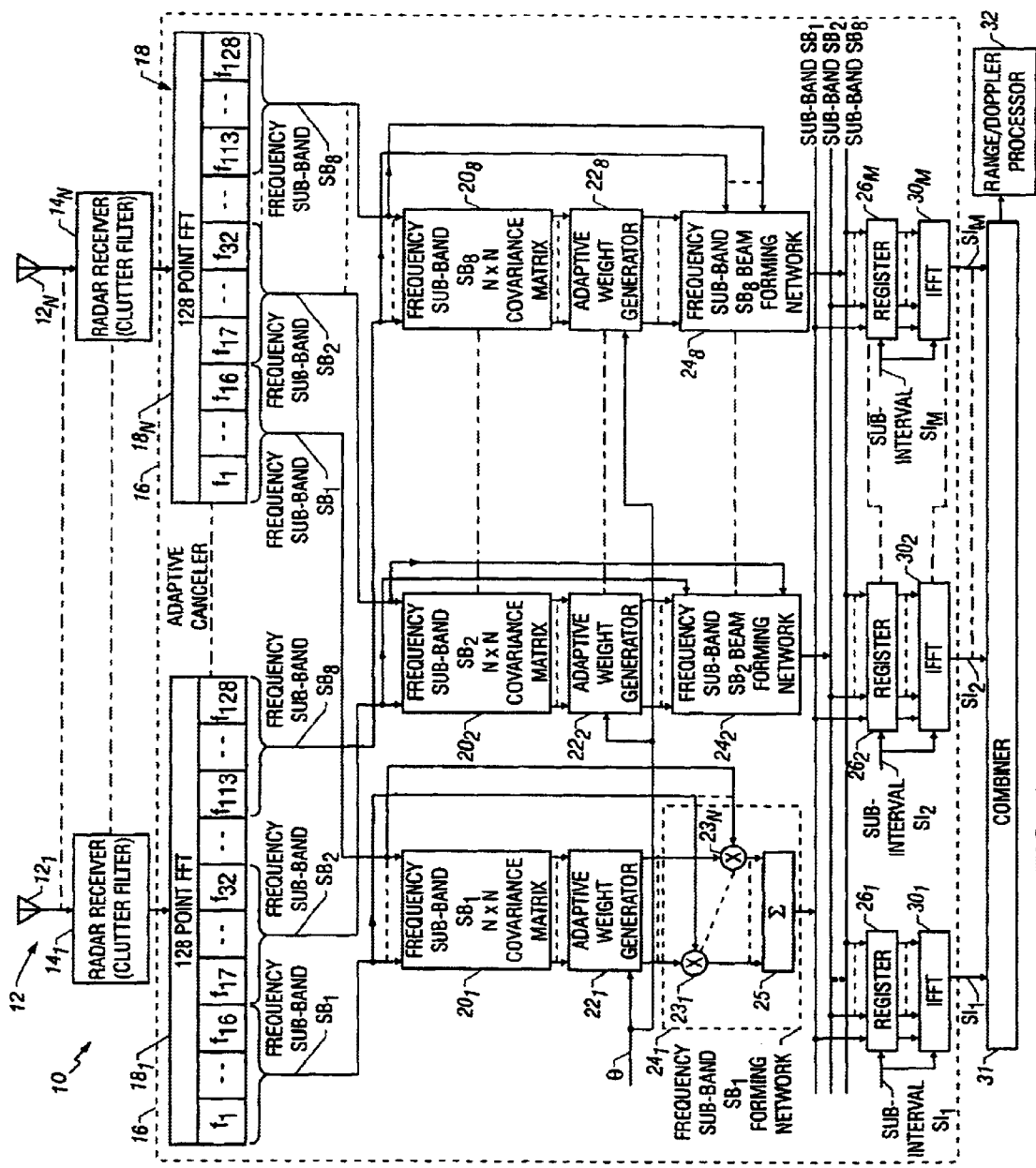
FIG. 1 is a functional block diagram of a radar system receiver having an adaptive jammer cancellation system according to the invention.

Referring now to FIG. 1, a radar system receiver 10 is shown having an antenna system 12 adapted to receive a jammer signal from both a direct path and from an indirect path. The direct and indirect paths have both differential Doppler frequency and differential time delay induced phase shifts. The antenna system 12 includes a plurality of, here N, antenna elements $12_1$–$12_N$, as shown. Each one of a plurality of, here N, radar receiver sections $14_1$–$14_N$ (each one having a clutter filter (not shown)), is fed by a corresponding one of the antenna elements $12_1$–$12_N$, respectively, as shown. An adaptive jammer canceler 16 is fed by the plurality of radar receiver sections $14_1$–$14_N$ to suppress both the direct and indirect paths of the jamming signal. More particularly, the canceler 16 separates each of a plurality of radar dwells into a plurality of, M, subintervals, determines frequency components in each of the sub-intervals, forms a plurality of frequency sub-band beam forming networks from the frequency components for each of a corresponding one of the sub-intervals to suppress the differential time delay phase shifts in the received jamming signal, and produces a composite output signal over the plurality of sub-intervals from the plurality of frequency sub-band beam forming networks to suppress the differential Doppler frequency induced phase shifts in the received jamming signal.

More particularly, the adaptive canceler 16 includes a Fast Fourier Transformer (FFT) section 18, here represented by FFTs $18_1$–$18_N$ coupled to a corresponding one of the receiver sections $14_1$–$14_N$, respectively, as shown, for determining the frequency spectrum (i.e., frequency components) of samples of the signals fed thereto from the receiver sections $14_1$–$14_N$, respectively. Here, for example, each $FFT_1$–$FFT_N$ determines 128 frequency components over a predetermined frequency bandwidth for each batch of 128 samples of the signals fed thereto from receiver sections $14_1$–$14_N$, respectively, during each of a series of M sub-intervals of a radar dwell.

The adaptive canceler 16 provides P, here P=8, covariance matrices $20_1$–$20_{P=8}$, one for each one of P frequency sub-bands ($SB_1$–$SB_P$) of the 128 frequency components produced by each one of N FFTs $14_1$–$14_N$. Thus, sub-bands $SB_1$, $SB_2$ . . . $SB_8$ include sixteen frequency components $f_1$–$f_{16}$, $f_{17}$–$f_{32}$, . . . $f_{113}$–$f_{128}$, respectively. Each one of the covariance matrices $20_1$–$20_8$ determines covariance coefficients from a corresponding one of the P=8 frequency sub-bands for the plurality of, N, antenna elements $14_1$–$14_N$. Thus, covariance matrix $20_1$ is fed frequency sub-band $SB_1$ from the plurality of antenna elements $14_1$–$14_N$; covariance matrix $20_2$ is fed frequency sub-band $SB_2$ from the plurality of antenna elements $14_1$–$14_N$; . . . ; and, covariance matrix $20_8$ is fed frequency sub-band $SB_8$ from the plurality of antenna elements $14_1$–$14_N$.

Each one of the covariance matrices $20_1$–$20_8$ processes the N×N common frequency sub-bands $SB_1$–$SB_8$ fed thereto in accordance with the above-mention article published in the IEEE ASSP Magazine to thereby produce N×N covariance matrix coefficients for adaptive weight generator $22_1$–$22_8$, respectively. Each one of the covariance matrices $22_1$–$22_8$ is coupled to a corresponding one of a plurality of adaptive weight generators $22_1$–$22_8$, respectively. Thus, for each sub-interval, each one of the adaptive weight generators $22_1$–$22_8$ is associated with a corresponding one of the frequency sub-bands $SB_1$–$SB_8$ and the plurality of, N, antenna elements $14_1$–$14_N$. The plurality of adaptive weight generators $22_1$–$22_N$ is also fed by a common signal representative of a desired beam pointing angle, θ. Each one of the adaptive weight generators $22_1$–$22_N$ provides N complex words, one for each of the N antenna elements $14_1$–$14_N$, representing the relative gain and phase shift to be provide to signals passing through the antenna elements $14_1$–$14_N$ to produce a beam having the desired direction, assuming an absence of a jamming signal.

The N complex digital words produced by each of the adaptive weight generators $22_1$–$22_8$ are fed to P, here 8, frequency sub-band beam forming networks $24_1$–$24_8$, respectively, as shown. Each one of the frequency sub-band beam forming networks $24_1$–$24_8$ is associated with a corresponding one of the P, here 8 frequency sub-bands $SB_1$–$SB_8$, respectively. The N complex outputs of each one of the frequency sub-band beam forming networks $24_1$–$24_8$ are multiplied by the corresponding one of the common frequency sub-bands $SB_1$–$SB_8$ from each of the N antenna elements $14_1$–$14_N$ fed thereto, and the products of multipliers $23_1$–$23_N$ are added in adder 25, as indicated, for each one of the sub-intervals.

Thus, after each sub-interval, the frequency sub-band beam forming networks $24_1$–$24_8$ form a beam for frequency sub-band for each of a corresponding one of the sub-intervals to suppress the differential time delay phase shifts in the received jamming signal.

The outputs from each of the frequency sub-band beam forming networks $24_1$–$24_N$ is fed to each of a plurality of, here M, registers $26_1$–$26_M$, each one of the registers $26_1$–$26_M$ corresponding to one of the M sub-intervals. Thus, resister $26_1$ stores the outputs of frequency sub-band beam forming networks $24_1$–$24_8$ after the first sub-interval; resister $26_2$ stores the outputs of frequency sub-band beam forming networks $24_1$–$24_8$ after the second sub-interval; . . . ; and, resister $26_M$ store the outputs of frequency sub-band beam forming networks $24_1$–$24_8$ after the Mth (i.e., the last) sub-interval of the dwell.

After the M sub-interval, registers $26_1$–$26_M$ have stored the data fed thereto, i.e., after the Mth sub-interval, the data in the registers $26_1$–$26_M$ is fed sequentially to a corresponding one of a plurality of, M, Inverse Fast Fourier Transformers (IFFT) $30_1$–$30_M$. The outputs of the IFFTs $30_1$–$30_M$ provide M outputs from the adaptive canceler 16. The outputs of the adaptive canceler 16 are fed to a combiner, e.g. signal summer. Each one of the IFFTs $30_1$–$30_M$ produces a corresponding, sequential time portion (i.e., sub-intervals, $SI_1$–$SI_M$) of a composite signal provided by a combiner 31 fed by the outputs of the IFFTs $30_1$–$30_M$ to suppress the differential Doppler frequency induced phase shifts in the received jamming signal jammer signals. The output of the combiner is fed to a conventional range/Doppler frequency processor 32. Thus, the composite output signal from the combiner 31 has suppressed differential Doppler frequency induced phase shifts in the received jamming signal.

Figure 2:
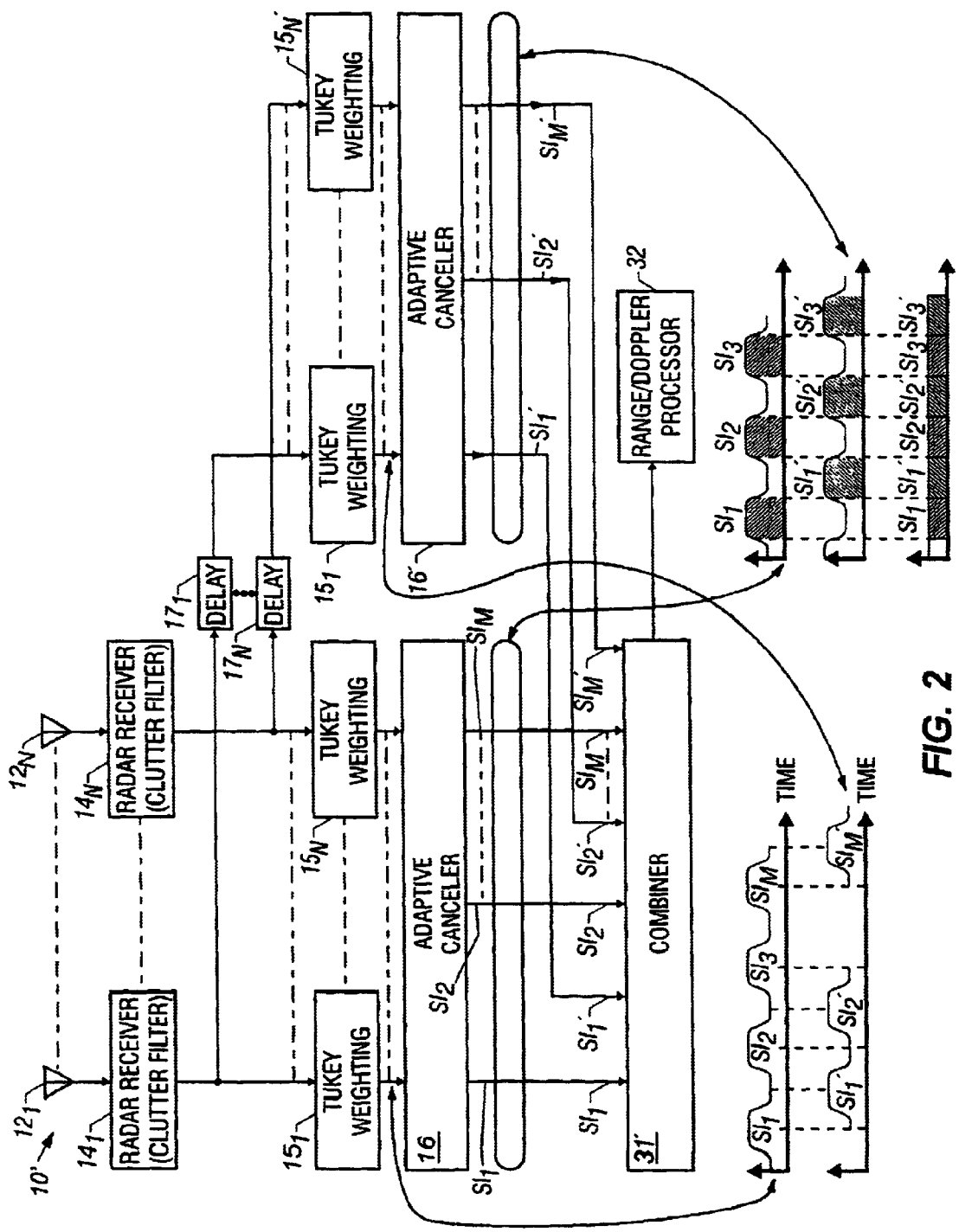
FIG. 2 is a functional block diagram of a radar system receiver having an adaptive jammer cancellation system using over-lapping sub-intervals according to the invention.

Referring now to FIG. 2, a radar system receiver 10' is shown for processing over-lapping sub intervals signals received by the antenna system 12. Here again, such received signal may include a jammer signal from both a direct path and from an indirect path. The direct and indirect paths have both differential Doppler frequency and differential time delay induced phase shifts. The antenna system 12 includes a plurality of, here N, antenna elements $12_1$–$12_N$, as shown. Each one of a plurality of, here N, radar receiver sections $14_1$–$14_N$ each one having a clutter filter (not shown), is fed by a corresponding one of the antenna elements $12_1$–$12_N$, respectively, as shown.

Here the system 10' includes a pair of adaptive jammer cancelers 16, 16', each one being substantially identical in constriction to the adaptive canceler 16 described above in connection with FIG. 1. Here, however, canceler 16 processes one set of the M sub-intervals, $SI_1$, $SI_2$, . . . $SI_M$ as described above, and the other canceler 16' processes a set of sub-intervals $SI'_1$–$SI'_M$. The sub-intervals $SI_1$–$SI_M$ overlap, here by 50 percent, the sub-intervals $SI_1$–$SI_M$ as indicated in FIG. 2. Thus, the outputs of antenna elements $14_1$–$14_N$ are fed to one-half sub-interval time delays $17_1$–$17_N$, respectively, as shown, prior to being fed to the adaptive canceler 16'. Identical processing is performed in each of the overlapping sub-intervals of each dwell. Further, it should be noted that prior to being fed to the adaptive cancelers 16, 16', the signals pass through Tukey weighting filters $15_1$–$15_N$, $15'_1$–$15'_N$ as indicated. The overlapping is desirable to enable the dwell to be more effectively re-assembled in the combiner 31. The Tukey weighting is applied to each sub-interval to minimize leakage between adjacent nulling frequency sub-bands. Tukey weighting with an α=0.5 is preferable so that the weighting is automatically removed by combiner 31 in the dwell re-assembling process. With an α=0.5, the middle fifty-percent of each sub-interval is uniformly weighted. During the dwell re-assembly provided by the combiner 31, concatenating the middle fifty-percent of each sub-interval is provided and the outer (i.e., initial and terminal) 25 percent is discarded. By doing overlapping and Tukey weighting, as described, it is not necessary to un-weight the data prior to the Doppler/range processing performed by the Range/Doppler processor 32 thereby reducing the dynamic range requirements of the system.

Other embodiments are within the spirit and scope of the appended claims.

What is claimed is:

1. A receiver, comprising:

a plurality of elements adapted to receive an interfering signal from both a direct path and from an indirect path, such direct and indirect paths having both differential Doppler frequency and differential time delay induced phase shifts;

a plurality of receiver sections, each one of the receiver sections being fed by a corresponding one of the elements;

an adaptive interfering signal canceler fed by the plurality of receiver sections for providing a beam forming network to suppress both the direct and indirect paths of the interfering signal, such canceler separating the received signal into a plurality of sub-intervals, determining frequency components in each of the sub-intervals over a predetermined frequency bandwidth, forming a plurality of frequency sub-band beam forming networks from the frequency components for each of a corresponding one of the sub-intervals to suppress the differential time delay phase shifts in the received interfering signal, and producing a composite output signal from the plurality of frequency sub-band beam forming networks over the plurality of sub-intervals to suppress the differential Doppler frequency induced phase shifts in the received interfering signal.

2. A radar system receiver, comprising:

an antenna system having a plurality of antenna elements adapted to receive a jammer signal from both a direct path and from an indirect path, such direct and indirect paths having both differential Doppler frequency and differential time delay induced phase shifts;

(A) a plurality of radar receiver sections, each one having a clutter filter, each one of the receiver sections being fed by a corresponding one of the antenna elements;

(B) an adaptive jammer canceler fed by the plurality of radar receiver sections for providing a beam to suppress both the direct and indirect paths of the jamming signal, such canceler comprising:

(a) a frequency transformation section for determining frequency components in each of a plurality of frequency sub-bands in signals received from the jammer by each one of the plurality of antenna elements over a predetermined frequency bandwidth;

(b) a covariance matrix fed by the determined frequency sub-bands for each of the plurality of antenna elements for determining covariance matrix coefficients for each of the frequency sub-bands;

(c) a beam forming network fed by the frequency components in each of the frequency sub-bands and the covariance matrix coefficients for forming an antenna beam for each of one of series of sub-intervals of a dwell to suppress the differential time delay phase shifts in the received jamming signal; and (d) an inverse frequency transformer and combiner for a composite output signal from the antenna beams produced during the series sub-intervals to suppress the differential Doppler frequency induced phase shifts in the received jamming signal.

3. A method for canceling both differential Doppler frequency and differential time delay induced phase shifts produced by direct and indirect paths of an interfering signal received by an antenna system, such antenna system having a plurality of antenna elements adapted to receive the interfering signal, comprising the steps of:

(A) determining, for each a plurality of radar dwell sub-intervals, frequency components of signals received by each of the antenna elements in each of a plurality of frequency sub-bands;

(B) producing, for each of the plurality of sub-intervals, a beam for each one of the determined frequency sub-bands in each sub-interval, such beam being adapted to suppress the differential time delay induced phase shifts in the received interfering signal during the sub-interval; and (C) combining the beams produced for each one of the sub-intervals into a composite beam, such composite beam being adapted to suppress the differential Doppler frequency induced phase shifts in the received interfering signal.

4. A method for canceling both differential Doppler frequency and differential time delay induced phase shifts produced by direct and indirect paths of an interfering signal received by an antenna system, such antenna system having a plurality of antenna elements adapted to receive the interfering signal, comprising the steps of:

(A) determining for each a plurality of radar dwell sub-intervals:

(a) frequency components of signals received by each of the antenna elements in each of a plurality of frequency sub-bands;

(b) for each one of the frequency sub-bands, covariance matrix coefficients in response to the signals in such one of the frequency sub-bands received by the plurality of antenna elements;

(B) producing, for each of the plurality of radar dwell sub-intervals, a beam for each one of the frequency sub-bands from the covariance matrix coefficients determined in each sub-interval, such beam being adapted to suppress the differential time delay induced phase shifts in the received interfering signal during the sub-interval; and (C) combining the beams produced for each one of the sub-intervals in a dwell into a composite beam for the dwell, such composite beam being adapted to suppress the differential Doppler frequency induced phase shifts in the received interfering signal.

* * * * *

UNITED STATES PATENT AND TRADEMARK OFFICE
CERTIFICATE OF CORRECTION

PATENT NO. : 6,650,271 B1
DATED : November 18, 2003
INVENTOR(S) : Simone et al.

It is certified that error appears in the above-identified patent and that said Letters Patent is hereby corrected as shown below:

<u>Title page,</u>
Item [57], ABSTRACT,
Line 22, delete "subintervals" and replace with -- sub-intervals --.

<u>Column 1,</u>
Line 64, delete "invention a" and replace with -- inventions, a --.

<u>Column 2,</u>
Line 67, delete "of a determined" and replace with -- of the determined --.

<u>Column 3,</u>
Line 52, delete "sub-interval a" and replace with -- sub-interval, a --.

<u>Column 4,</u>
Line 35, delete "BRIEF DESCRIPTION OF THE DRAWING" and replace with
-- BRIEF DESCRIPTION OF THE DRAWINGS --.
Line 64, delete "apparent from subintervals" and replace with -- apparent from sub-intervals --.

<u>Column 5,</u>
Line 21, delete "$14_1$-$14_N$." and replace with -- $18_1$-$18_N$. --.
Line 49, delete "to be provide" and replace with -- to be provided --.

<u>Column 6,</u>
Line 34, delete "sub intervals" and replace with -- sub-intervals --.

<u>Column 7,</u>
Line 1, delete "dwell re-assembly" and replace with -- dwell, re-assembly --.

UNITED STATES PATENT AND TRADEMARK OFFICE
CERTIFICATE OF CORRECTION

PATENT NO. : 6,650,271 B1
DATED : November 18, 2003
INVENTOR(S) : Simone et al.

It is certified that error appears in the above-identified patent and that said Letters Patent is hereby corrected as shown below:

Column 7,
Line 1, delete "dwell re-assembly" and replace with -- dwell, re-assembly --.

Signed and Sealed this

Fifteenth Day of June, 2004

JON W. DUDAS
*Acting Director of the United States Patent and Trademark Office*